(12) United States Patent
Bernardoni et al.

US011161785B2

(10) Patent No.: US 11,161,785 B2
(45) Date of Patent: Nov. 2, 2021

(54) PHOTOCATALYTIC COMPOSITIONS, AND USES THEREOF FOR OBTAINING WATER PAINTS

(71) Applicant: AM TECHNOLOGY LIMITED, Hertfordshire (GB)

(72) Inventors: Massimo Bernardoni, Hertfordshire (GB); Antonio Cianci, Hertfordshire (GB)

(73) Assignee: AM TECHNOLOGY LIMITED, Hertfordshire (GB)

( * ) Notice: Subject to any disclaimer, the term of this patent is extended or adjusted under 35 U.S.C. 154(b) by 38 days.

(21) Appl. No.: 16/312,532

(22) PCT Filed: Jun. 27, 2017

(86) PCT No.: PCT/GB2017/051872
§ 371 (c)(1),
(2) Date: Dec. 21, 2018

(87) PCT Pub. No.: WO2018/002603
PCT Pub. Date: Jan. 4, 2018

(65) Prior Publication Data
US 2019/0241470 A1 Aug. 8, 2019

(30) Foreign Application Priority Data
Jun. 27, 2016 (GB) .................................. 1611117
Jul. 29, 2016 (GB) .................................. 1613189

(51) Int. Cl.
| C04B 22/06 | (2006.01) |
| C04B 28/04 | (2006.01) |
| C09D 1/06 | (2006.01) |
| C09D 7/40 | (2018.01) |
| B01J 21/06 | (2006.01) |
| B01J 35/00 | (2006.01) |
| C04B 14/08 | (2006.01) |
| C04B 14/10 | (2006.01) |
| C04B 14/24 | (2006.01) |
| C04B 24/26 | (2006.01) |
| C04B 24/38 | (2006.01) |
| C04B 111/20 | (2006.01) |
| C04B 111/00 | (2006.01) |
| C04B 103/50 | (2006.01) |

(52) U.S. Cl.
CPC ............. *C04B 22/06* (2013.01); *B01J 21/063* (2013.01); *B01J 35/004* (2013.01); *B01J 35/0013* (2013.01); *C04B 14/08* (2013.01); *C04B 14/106* (2013.01); *C04B 14/24* (2013.01); *C04B 24/26* (2013.01); *C04B 24/2611* (2013.01); *C04B 24/2623* (2013.01); *C04B 24/2682* (2013.01); *C04B 24/383* (2013.01); *C04B 28/04* (2013.01); *C09D 1/06* (2013.01); *C09D 7/69* (2018.01); *C04B 2103/50* (2013.01); *C04B 2111/00482* (2013.01); *C04B 2111/00508* (2013.01); *C04B 2111/00827* (2013.01); *C04B 2111/2061* (2013.01); *C04B 2201/30* (2013.01)

(58) Field of Classification Search
CPC .... B01J 21/063; B01J 35/0013; B01J 35/004; C04B 22/06; C04B 14/08; C04B 14/106; C04B 14/24; C04B 24/26; C04B 24/2611; C04B 24/2623; C04B 24/2682; C04B 24/383; C04B 28/04; C04B 2103/50; C04B 2111/00482; C04B 2111/00508; C04B 2111/00827; C04B 2111/2061; C04B 2201/30
USPC ..................... 502/350; 501/1, 11, 33, 65, 77
See application file for complete search history.

(56) References Cited

U.S. PATENT DOCUMENTS

| 6,387,844 B1 * | 5/2002 | Fujishima ............... A61L 9/205 427/164 |
| 2007/0224362 A1 | 9/2007 | Briand et al. |
| 2010/0022383 A1 * | 1/2010 | Kuntz .................. C09D 5/1687 502/84 |
| 2012/0118318 A1 * | 5/2012 | Hillebrandt Poulsen .................... C09D 5/1606 134/1.3 |

(Continued)

FOREIGN PATENT DOCUMENTS

| EP | 1 524 249 A1 | 4/2005 |
| WO | 2015/145375 A1 | 10/2015 |
| WO | 2016/005606 A1 | 1/2016 |

OTHER PUBLICATIONS

International Search Report, dated Sep. 20, 2017, issued in International Application No. PCT/GB2017/051872.

(Continued)

*Primary Examiner* — Patricia L. Hailey
(74) *Attorney, Agent, or Firm* — Saul Ewing Arnstein & Lehr LLP

(57) ABSTRACT

The invention relates to photocatalytic compositions, e.g. cement-based photocatalytic compositions, and the uses thereof for obtaining water paints. There is provided a photocatalytic composition, which comprises: (a) at least one inorganic binder; (b) at least one photocatalyst; (c) at least one cellulose with very low viscosity; (d) at least one fluidizing agent; (e) at least one first calcareous filler in the form of particles of which at least 95% by weight has a dimension not greater than 40 µm; (f) at least one second calcareous filler in the form of particles of which at least 95% by weight has a dimension not greater than 20 µm; (g) at least one thermal insulator material comprising hollow ceramic spheres with sub-mm diameters, and (h) glass bubble borosilicate microspheres.

26 Claims, 2 Drawing Sheets

(56) References Cited

U.S. PATENT DOCUMENTS

| 2014/0004331 | A1* | 1/2014 | Hida | C09J 7/29 |
| | | | | 428/220 |
| 2015/0252566 | A1* | 9/2015 | Tangeman | C03C 17/007 |
| | | | | 514/770 |
| 2018/0170799 | A1* | 6/2018 | Hillebrandt Poulsen | ................ |
| | | | | C09D 7/68 |

OTHER PUBLICATIONS

3M Glass Bubbles, 3M Center St. Paul, MN 55144-1000, USA (2013).
KRONOClean 7000. Kronos Worldwide, Inc., 5430 LBJ Freeway, Suite 1700, Dallas, TX, 75240, United States (2011).
Kronos vlp—Cleaning with light, Kronos International Inc., Peschstr. 5, D-51373 Leverkusen, Germany (2006).
Microsfere cave di vetro, 3M Italia srl, Via Norberto Bobbio, 21, 20096 Pioltello MI, Italy (2014).
NanoceramiX PicoceramiX Nanotermica, Ludovici Raffaele e Figli s.r.l., S.S. 261 Subequana—Loc. La Fossa—67021 Barisciano (AQ), Italy (2015).

* cited by examiner

| Product | Particle Size (microns, by volume) 3M QCM 193.0 | | | |
|---|---|---|---|---|
| | Distribution | | | Effective Top Size |
| | 10th% | 50th% | 90th% | |
| K Series | | | | |
| K1 | 30 | 65 | 115 | 120 |
| K15 | 30 | 60 | 105 | 115 |
| K20 | 30 | 60 | 90 | 105 |
| K25 | 25 | 55 | 90 | 105 |
| K37 | 20 | 45 | 80 | 85 |
| K46 | 15 | 40 | 70 | 80 |
| S Series | | | | |
| S15 | 25 | 55 | 90 | 95 |
| S22 | 20 | 35 | 65 | 75 |
| S32 | 20 | 40 | 70 | 80 |
| S35 | 20 | 40 | 65 | 80 |
| S38 | 15 | 40 | 75 | 85 |
| S38HS | 19 | 44 | 70 | 85 |
| S60 | 15 | 30 | 55 | 65 |
| S60HS | 12 | 29 | 48 | 60 |
| iM Series | | | | |
| iM16K | 12 | 20 | 30 | 40 |
| iM30K | 8.6 | 15.3 | 23.6 | 26.7 |

FIGURE 1

| | |
|---|---|
| TiO$_2$-Content (ISO 591) | > 87.5 % |
| Crystal modification | anatase |
| Density (ISO 787, Part 10) | 3.9 g/cm$^3$ |
| Crystallite size | approx. 15 nm |
| Specific surface area (BET) | > 225 m$^2$/g |
| Bulk density | 350 g/l |
| Oil absorption[1] | ~ 67 g/100 g |
| Water demand[1] | ~ 210 g/100 g |
| Max. processing temperature | 200 °C |
| Application pH-range | 4 – 9 |
| Typical photocatalytic activity (ISO 22197, Part 1) | Degradation [mmol/(h·m$^2$)] NO$_x$ |
| UV(A) radiation[2] | 57.8 |
| Visible light[3] | 19.2 |

Methods of determination:
[1] internal standard method
[2] Irradiance = 10 W/m$^2$
[3] Irradiance = 1700 lux; Part of UV(A) radiation <11 mW/m$^2$

FIGURE 2

PHOTOCATALYTIC COMPOSITIONS, AND USES THEREOF FOR OBTAINING WATER PAINTS

CROSS REFERENCE TO RELATED APPLICATIONS

This application claims the priority of PCT/GB2017/051872, filed on Jun. 27, 2017, which claims priority to GB Application No. 1611117.1, filed Jun. 27, 2016; and GB Application No. 1613189.8, filed on Jul. 29, 2016, the entire contents of each of which is fully incorporated herein by reference.

BACKGROUND OF THE INVENTION

1. Field of the Invention

The field of the invention relates to photocatalytic compositions, e.g. cement-based photocatalytic compositions, and the uses thereof for obtaining water paints.

2. Technical Background

The present disclosure regards photocatalytic compositions, e.g. cement-based photocatalytic compositions, and the uses thereof for obtaining water paints.

Photocatalysis is a natural phenomenon regarding some substances, known as photocatalysts, which—when irradiated with light of suitable wavelength—are capable of catalyzing some chemical reactions. In particular, in the presence of air and light, oxidative processes are activated on a surface containing a photocatalytic substance that leads to the transformation and/or decomposition of organic and inorganic polluting substances (e.g. microbes, nitrogen oxides, polycondensate aromatic products, benzene, sulfur dioxide, carbon monoxide, formaldehyde, acetaldehyde, methanol, ethanol, benzene, ethylbenzene, methylbenzene, nitrogen monoxide and dioxide). Such polluting and/or toxic substances are transformed, through the photocatalysis process, into innocuous substances that can be washed away by rain water or via washing, such as sodium nitrate ($NaNO_3$), calcium sulfate ($CaSO_4$), calcium nitrate ($Ca(NO_3)_2$) and calcium carbonate ($CaCO_3$).

Therefore photocatalytic processes can be used for considerably reducing the pollutants present in the environment, such as those produced by the exhaust gases of automobiles, factories, home heating and other sources, and at the same time eliminate dirt, mold, and bacteria that degrade the surfaces of buildings or other structures.

The photocatalysts are generally metal compounds such as titanium dioxide, $TiO_2$, which is the most active and most used, zinc oxide, $ZnO$, and other oxides and sulfides (e.g. $CeO_2$, $ZrO_2$, $SnO_2$, $CdS$, $ZnS$, etc.).

Much effort has been expended to provide compositions containing a photocatalyst to be used for coating building surfaces, which can be applied with the techniques commonly employed in the building industry; such compositions ensure a significant and enduring photocatalytic effect, simultaneously ensuring a satisfactory aesthetic effect, as well as of course at non-excessive costs, so as to allow the application thereof on a large scale.

3. Discussion of Related Art

According to the prior art, the photocatalytic product is usually incorporated in formulations of paints or varnishes with a substantially organic base of a conventional type. Nevertheless, such formulations, given that they are of an organic nature, undergo the action of transformation and/or decomposition catalyzed by the photocatalyst, so that the properties of the applied coating are degraded over time, leading to detachment and pulverization phenomena, as well as causing a quick decay of the original photocatalytic properties.

Also known in the art are cement-based compositions which comprise a photocatalyst.

For example, in the patent application WO 2009/013337, photocatalytic compositions are described which comprise: a hydraulic binder, a polycarboxylic or acrylic superfluidizing agent; a cellulose ether with viscosity comprised between 10,000 and 120,000 mPa·s; an adhesive agent; a calcareous, silicic or silicocalcareous filler, and a photocatalyst. Such compositions would be provided with rheological properties such as to render them particularly suitable for the application on large surfaces, without dripping or deformations.

In the patent application WO 2013/018059, a photocatalytic powder paint is described for use diluted in water, which comprises: Portland cement combined with photocatalytic titanium dioxide in nanoparticle form; a calcareous inert substance with maximum particle size lower than 100 μm; cellulose with a viscosity lower than 1000 mPa·s; a fluidizing agent; an anti-foaming agent; a vinyl polymer, and pigments. Such a composition also comprises at least one of the following additives: metakaolin, calcium formate and diatomaceous earth.

The Applicant has faced the technical problems of improving the reflectance of the dried paint product, improving the yield (the dried paint area painted per kg of liquid paint) on the surface for the dried paint product, improving thermal insulation of the dried paint product, improving the surface coverage and the easiness of work of the liquid paint, reducing the tendency of paint brush lines to remain in the dried paint product, improving the gliding of the liquid paint product across a surface, reducing the mixing times of the cement-based photocatalytic powder with water, reducing the density of the liquid paint, increasing the maximum amount of water per kg of cement-based photocatalytic powder, and increasing the pot life of the liquid paint, which is the time taken for the paint to harden.

The Applicant has faced the technical problems of providing a photocatalytic composition (e.g. a cement-based composition), usable for obtaining water paints, namely wall coatings with very low thickness, In particular for outdoor applications, which is capable of:

(a) ensuring a high photocatalytic effect that is stable over time, also with relative low quantities of photocatalyst, generally lower than 10% by weight;

(b) allowing the preparation and application of the water paint with conventional apparatus, such as those used for common painting works, with optimal results in terms of uniformity of the coating and resistance of the same to weathering agents;

(c) using products devoid of toxic effects, without using heavy metals or dangerous and organic solvents, in particular aromatic solvents, so as to obtain a product with a content of volatile organic compounds (VOC) lower than 0.35 g/l.

These and further objects that will be better illustrated hereinbelow have been achieved by the Applicant by use of a cement-based photocatalytic composition as defined in the following description and/or enclosed claims, which allows obtaining an improved reflectance of the visible radiation, and other effects.

SUMMARY OF THE INVENTION

According to a first aspect of the invention, there is provided a photocatalytic composition, which comprises:
(a) at least one inorganic binder;
(b) at least one photocatalyst;
(c) at least one cellulose with very low viscosity;
(d) at least one fluidizing agent;
(e) at least one first calcareous filler in the form of particles of which at least 95% by weight has a dimension not greater than 40 μm;
(f) at least one second calcareous filler in the form of particles of which at least 95% by weight has a dimension not greater than 20 μm;
(g) at least one thermal insulator material comprising hollow ceramic spheres with sub-mm diameters, and
(h) glass bubble borosilicate microspheres.

Advantages are that the hollow ceramic spheres with sub-mm diameters improve the yield (the dried paint area painted per kg of liquid paint) on the surface for the dried paint product, improve the thermal insulation of the dried paint product, and improve the reflectance of the dried paint product; the glass bubble borosilicate microspheres improve the yield (the dried paint area painted per kg of liquid paint) on the surface for the dried paint product, improve the reflectance of the dried paint product and easiness of work of the liquid paint including the composition. A paint including the composition has a reduced tendency of paint brush lines to remain in the dried paint product, and has improved gliding of the liquid paint product across a surface. A paint including the composition has a low mixing time of 1 minute. A paint including the composition has a low specific gravity of 1.0, with reference to water. A paint including the composition has a high yield of 14 m$^2$/kg. A paint including the composition may contain up to 7.5 litres of water per 10 kg of paint, a high amount. The pot life of the liquid paint including the composition, which is the time taken for the paint to harden, is 3 hours, which is a long time.

The photocatalytic composition may be one in which:
(a) the inorganic binder is a cement binder, in the range of 20% to 50% by weight;
(b) the photocatalyst is Titanium Dioxide particles, photocatalytically active in the visible spectrum, comprising 0.5% to 5% by weight;
(c) the cellulose with very low viscosity is in the range of 0.8% to 2.2% by weight;
(d) the fluidizing agent is in the range of 0.1% to 1.2% by weight;
(e) the first calcareous filler is in the range of 15% to 35% by weight;
(f) the second calcareous filler is in the range of 15% to 35% by weight;
(g) the thermal insulator material comprising hollow ceramic spheres with sub-mm diameters is in the range of 0.1% to 4% by weight;
(h) the glass bubble borosilicate microspheres are in the range of 0.1% to 4% by weight.

Advantages include those listed above.

The photocatalytic composition may be one wherein the cement binder (a) is a Portland cement.

The photocatalytic composition may be one wherein the photocatalyst is Titanium Dioxide particles in the anatase crystalline form.

The photocatalytic composition may be one wherein the Titanium Dioxide particles in the anatase crystalline form has a granulometry such that at least 95% by weight has a dimension not higher than 50 nm, preferably not higher than 20 nm.

The photocatalytic composition may be one wherein the photocatalytic titanium dioxide is in admixture with a non-photocatalytic titanium dioxide.

The photocatalytic composition may be one wherein the non-photocatalytic titanium dioxide is in the range of 2% to 10% by weight.

The photocatalytic composition may be one wherein the cellulose (c) has a Brookfield viscosity RVT at 20° C. from 100 to 70,000 mPa·s, preferably from 100 to 30,000 mPa·s, more preferably from 200 to 10,000 mPa·s.

The photocatalytic composition may be one further comprising. (i) at least one hydrophobized vinyl polymer, preferably a terpolymer of vinylchloride, ethylene and a vinyl ester CH2=CH—O—C(=O)—R, wherein R is an alkyl, linear or branched, C4-C24.

The photocatalytic composition may be one wherein the at least one hydrophobized vinyl polymer is in the range of 1% to 6% by weight.

The photocatalytic composition may be one in which the fluidizing agent is polycarboxylic acid.

The photocatalytic composition may be one including metakaolin in the range of 1.5% to 10% by weight.

The photocatalytic composition may be one including an anti-foaming agent in the range of 0.1% to 2.8% by weight.

The photocatalytic composition may be one wherein the hollow ceramic sub-mm spheres have a thermal conductivity below 0.20 W/mK.

The photocatalytic composition may be one wherein the hollow ceramic sub-mm spheres include a heat-reflective coating.

The photocatalytic composition may be one wherein the hollow ceramic sub-mm spheres have an average diameter below 200 μm.

The photocatalytic composition may be one wherein the hollow ceramic sub-mm spheres have an average diameter below 50 μm.

The photocatalytic composition may be one including an instantly dispersible pigment.

According to a second aspect of the invention, there is provided a use of a photocatalytic composition according to any aspect of the first aspect of the invention, for coating building artifacts in order to reduce the presence of polluting agents.

The use may be one wherein water is added to the photocatalytic composition in a predetermined proportion, by mixing until a homogeneous and fluid product is obtained.

The use may be one wherein the weight ratio between water and cement binder (a) is from 0.2 to 0.8.

The use may be one wherein, after application and drying, the photocatalytic composition forms a coating layer having a thickness from 0.05 mm to 1 mm, preferably from 0.1 to 0.5 mm.

According to a third aspect of the invention, there is provided a use of a photocatalytic composition according to any aspect of the first aspect of the invention, for coating surfaces made of metal, wood or plastic material, e.g. polyvinylchloride (PVC).

The photocatalytic composition may be one not including heavy metals and organic solvents.

The photocatalytic composition may be one with a content of volatile organic compounds (VOC) of less than 0.35 g/liter.

The photocatalytic composition may be one including air-entraining agents.

The photocatalytic composition may be one including kieselguhr.

According to a fourth aspect of the invention, there is provided a coating obtained using a photocatalytic composition according to any aspect of the first aspect of the invention.

According to a fifth aspect of the invention, there is provided a dry mixture, having a composition according to any aspect of the first aspect of the invention, but not including water.

According to a sixth aspect of the invention, there is provided a photocatalytic coating, including the dry mixture of the fifth aspect of the invention, mixed with water.

According to a seventh aspect of the invention, there is provided a use of a photocatalytic composition according to any aspect of the first aspect of the invention, in a fluid paint, without dripping.

According to an eighth aspect of the invention, there is provided a building or construction which has received a coating including a photocatalytic composition according to any aspect of the first aspect of the invention.

The building or construction may be coated externally.

The building or construction may be coated internally.

According to a ninth aspect of the invention, there is provided a method of coating a building or construction, the method including the step of coating the building or construction using a coating including a photocatalytic composition according to any aspect of the first aspect of the invention.

The method may be one wherein the coating is applied externally to the building or construction.

The method may be one wherein the coating is applied internally to the building or construction.

According to a tenth aspect of the invention, there is provided a method of manufacturing a photocatalytic composition, including mixing together the components of any aspect of the first aspect of the invention.

The method may be one including mixing together the components for a time sufficient to obtain a good homogenization.

According to an eleventh aspect of the invention, there is provided a computer program product, the computer program product executable on a computer to control a method of manufacturing a photocatalytic composition according to a tenth aspect of the invention.

BRIEF DESCRIPTION OF THE FIGURES

Aspects of the invention will now be described, by way of example(s), with reference to the following Figures, in which:

FIG. 1 shows a Table of particle size data for a range of 3M (REGISTERED TRADE MARK IN THE UK) glass bubbles products. Source: 3M (REGISTERED TRADE MARK IN THE UK) Glass Bubbles K Series, S Series and iM Series product information, 3M Center St. Paul, Minn. 55144-1000, USA (2013).

FIG. 2 shows a Table of typical product characteristics for KRONOClean (REGISTERED TRADE MARK IN THE EU) 7000. Source: KRONOS Worldwide, Inc., 5430 LBJ Freeway, Suite 1700, Dallas, Tex., 75240, United States (2011).

DETAILED DESCRIPTION

Reference may be had to WO2015145375A1 regarding related compositions, uses and methods. WO2015145375A1 is incorporated by reference.

Compositions are disclosed, according to the following Table, according to the disclosed components and associated ranges, in percentage by weight.

| Component | From (%) | To (%) |
| --- | --- | --- |
| Inorganic binder e.g. cement binder | 20 | 50 |
| First calcareous filler in the form of particles of which at least 95% by weight have a size not greater than 40 μm | 15 | 35 |
| Second calcareous filler in the form of particles of which at least 95% by weight have a size not greater than 20 μm | 15 | 35 |
| Metakaolin | 1.5 | 10 |
| Titanium dioxide | 2 | 10 |
| Cellulose with very low viscosity | 0.8 | 2.2 |
| Fluidizing polycarboxylic acid | 0.1 | 1.2 |
| Hydrophobized vinyl polymer | 1 | 6 |
| Anti-foaming agent | 0.1 | 2.8 |
| Ceramic sub-mm spheres e.g. Nanospheres, e.g. average diameter 100 μm, or e.g. average diameter 25 μm. e.g. from Ludovici Raffaele e Figli s.r.l. S.S. 261 Subequana - Loc. La Fossa - 67021 Barisciano (AQ), Italy | 0.1 | 4 |
| Glass Bubbles e.g. hollow borosilicate microspheres e.g. by 3M | 0.1 | 4 |
| Nano-sized Titanium Dioxide particles, photocatalytically active in the visible spectrum | 0.5 | 5 |

The compositions may additionally include instantly dispersible pigments, as required.

In the scope of the present description and of the enclosed claims, the quantities of the various components of the photocatalytic composition are expressed, except where differently indicated, as percentages by weight with respect to the overall weight of the composition itself.

In an aspect, the present disclosure regards the use of a cement-based photocatalytic composition as defined above for coating building structures in order to reduce the presence of polluting agents.

In addition, the present disclosure regards the use of a cement-based photocatalytic composition as defined above for coating surfaces made of metal, wood or plastic material, e.g. polyvinylchloride (PVC). With regard to the cement binder, this is generally made of a hydraulic cement material in powder form in dry state, which, when mixed with water, forms a plastic material that is capable of consolidating and hardening after a time sufficient to allow the application thereof in the plastic state. Preferably, the cement binder is Portland cement.

Preferably, the photocatalyst is titanium dioxide in photocatalytic form, i.e. mainly in anatase crystalline form. The photocatalytic titanium dioxide preferably has a particle size such that at least 95% by weight has a size not greater than 50 nm, more preferably not greater than 20 nm. Preferably the photocatalytic titanium dioxide has a surface area comprised between 100 and 500 m$^2$/g. The photocatalytic titanium dioxide can also be used in admixture with non-photocatalytic titanium dioxide, for example in rutile crystalline form, which allows imparting an intense white color to the composition. Preferably, the non-photocatalytic titanium dioxide is present in a quantity from 0.5 to 20% by weight, more preferably from 2 to 10% by weight.

In an example, the photocatalyst which is titanium dioxide in photocatalytic form, i.e. mainly in anatase crystalline form, is KRONOClean (REGISTERED TRADE MARK IN THE EU) 7000, supplied by KRONOS Worldwide, Inc., 5430 LBJ Freeway, Suite 1700, Dallas, Tex., 75240, United States. Example typical product characteristics for KRO-NOClean (REGISTERED TRADE MARK IN THE EU) 7000 are shown in FIG. 2.

As regards a cellulose with a very low viscosity, this preferably has a Brookfield viscosity RVT at 20° C. from 100 to 70,000 mPa·s, more preferably from 100 to 30,000 mPa·s, even more preferably from 200 to 10,000 mPa·s. The viscosity can be measured, for example, on a 2% solution by weight in water. In particular, the cellulose can be a cellulose ether which can be selected from: ethylcellulose, hydroxypropylcellulose, methylhydroxypropylcellulose, methylcellulose, carboxymethyl cellulose, methylcarboxyethylcellulose, or mixtures thereof. Products of this type can be found on the market, for example with the trademarks Culminal (REGISTERED TRADE MARK IN THE UK), Walocel (REGISTERED TRADE MARK IN THE UK) and Tylose (REGISTERED TRADE MARK IN THE UK).

A fluidizing agent can be selected from the products commonly employed in the cement field. These are usually vinyl or acrylic polymers, such as for example: polyvinylacetate, polyvinylversatate, polybutylacrylate or copolymers thereof (e.g. commercial products by Elotex). Preferably, the fluidizing agent is a superfluidizing agent, e.g. polycarboxylate, more specifically a copolymer from an unsaturated mono- or dicarboxylic acid and a polymerizable unsaturated comonomer. Examples of unsaturated mono- or dicarboxylic acids include: acrylic acid, methacrylic acid, crotonic acid, maleic acid, fumaric acid, itaconic acid, citraconic acid, and the like. Examples of polymerizable unsaturated comonomers include: polyalkylene glycol mono (meth) acrylate (e.g.: triethylene glycol monoacrylate and polyethylene glycol monoacrylate, in which the polyethylene glycol has an average molecular weight from 200 to 1000). Products of this type can be found on the market, for example with the trademark Melflux (REGISTERED TRADE MARK IN THE EU).

Calcareous fillers, defined for example in the UNI EN 12620: 2008 standard, are finely subdivided calcareous minerals, mainly containing calcium carbonate (generally the calcium carbonate content is at least equal to 75% by weight). The Applicant believes that the addition of a second calcareous filler, having finer particle size than the first, allows obtaining a coating of greater quality since the smaller granules fill the interstices present between the particles of the other materials, in particular between the particles of the photocatalyst.

A photocatalytic composition in accordance with the present disclosure may comprise at least one hydrophobized vinyl polymer, which allows to increase the hydrophobic properties of the water paint. Such polymer, available in powder form, can be preferably added in a quantity from 1 to 20% by weight, more preferably from 1 to 6% by weight. Preferably, the hydrophobized vinyl polymer is a vinylchloride, ethylene and vinyl ester terpolymer $CH_2=CH-O-C(=O)-R$, where R is an alkyl, linear or branched, C4-C24, e.g. vinyl laurate. Products of this type can be found on the market, for example with the trademark Vinnapas (REGISTERED TRADE MARK IN THE EU).

Ceramic sub-mm spheres in a photocatalytic composition in accordance with the present disclosure may be so-called "Nanospheres", e.g. average diameter 100 μm, or e.g. average diameter 25 μm. e.g. from Ludovici Raffaele e Figli s.r.l. S.S. 261 Subequana—Loc. La Fossa—67021 Barisciano (AQ), Italy. The spheres may be hollow. The spheres may include a non-toxic coating. World Customs Organization Harmonized Commodity Description and Coding System Harmonization #: 6815-99-4000. US Toxic Substances Control Act (TSCA) CAS registration numbers: 1302-98-8, 1335-30-4, 65997-17-3, 1344-00-9. The spheres may have a 98% resistance to compression, at 7000 psi. The spheres may have a hardness of 5 on the Mohs scale. The spheres may have a density of approximately 0.40 g/cm$^3$. The composition of the spheres may include: silicon 65%, aluminium 9.6%, titanium dioxide 0.4%. The spheres may have a fusion temperature of about 1600° C., an emissivity of 0.62 and an index of refraction of 1.53. The spheres may have a thermal conductivity of 0.101 W/mK (certified by Certimac, Via Granarolo, 62 Faenza (RA), 48018, Italy). The thermal insulation thickness provided may be 250 μm, for 2 layers of average diameter 100 μm spheres, or 60 μm, for 2 layers of average diameter 25 μm spheres. Surface resistance of an internal wall treated with two coats of product may be: 0.1655 m$^2$K/W (certified by Certimac). Surface resistance of an external wall treated with two coats of product may be: 0.0425 m$^2$K/W (certified by Certimac). In an example, the ceramic sub-mm spheres have a thermal conductivity below 0.2 W/mK. In an example, the ceramic sub-mm spheres have an average diameter below 200 μm. In an example, the ceramic sub-mm spheres have an average diameter below 50 μm.

There is provided a paint, for indoors or for outdoors, containing ceramic sub-mm spheres which are hollow with a heat-reflective coating and are characterized by a titanium dioxide component below 0.35%. These ceramic sub-mm spheres may have an emissivity of less than 0.63, an average grain size of 100 microns or 25 microns, an ecological certification by the Green Building Council, and a thermal conductivity of 0.11 W/mK. The ceramic sub-mm spheres may be inert (chemically stable) and non-carcinogenic. The ceramic sub-mm spheres may be mixed in the paint in the relevant proportions, respecting fully both the operating instructions relating to ceramic sub-mm spheres, and those for painting.

Glass bubbles may be engineered hollow glass microspheres that are alternatives to conventional fillers and additives such as silicas, calcium carbonate, talc, clay, etc., for applications. These low-density particles may be used to reduce weight, lower costs and enhance product properties. Glass bubbles with a spherical shape offer a number of important benefits, including: higher filler loading, lower viscosity/improved flow and reduced shrinkage and warpage. Glass bubbles may blend readily into compounds and may be adaptable to a variety of production processes including spraying, casting and molding.

The chemically stable soda-lime-borosilicate glass composition of 3M (REGISTERED TRADE MARK IN THE UK) glass bubbles provides excellent water resistance to create more stable emulsions. They are also non-combustible and nonporous, so they do not absorb resin. And, their low alkalinity gives 3M (REGISTERED TRADE MARK IN THE UK) glass bubbles compatibility with most resins, stable viscosity and long shelf life.

3M (REGISTERED TRADE MARK IN THE UK) Glass Bubbles K Series, S Series and iM Series are specially formulated for a high strength-to-weight ratio. They produce stable voids, which results in low thermal conductivity and a low dielectric constant. Particle size data for a range of 3M (REGISTERED TRADE MARK IN THE UK) Glass Bubbles K Series, S Series and iM Series products are given in FIG. 1.

A photocatalytic composition in accordance with the present disclosure can also comprise further additives commonly used in this product type, such as: anti-foaming agents, pigments, aerating additives, calcium formate, diatomaceous earth, etc.

A photocatalytic composition in accordance with the present disclosure can be produced in accordance with known techniques, via mixing of the various components in a dry state in any order, using a suitable mechanical mixer, e.g. a planetary mixer, for a time sufficient for obtaining good homogenization.

In order to prepare the water paint, water is added to the photocatalytic composition in the predetermined proportion, mixing until a homogeneous and fluid product is obtained.

The weight ratio between water and cement binder can vary within wide limits as a function of the specificity of the used components and of the application technique that one wishes to employ. The water/binder weight ratio is generally comprised between 0.2 and 0.8.

The application of the water paint can be made with conventional apparatus, such as those used for common painting works, like brushes and rollers, or even spatulas, trowels, airless pumps, etc. The application can occur on buildings of various type, such as wall structures, both external and internal, tiles, slabs, prefabricated structures, cement buildings such as sound absorbent barriers and new jersey barriers, tunnels, exposed concrete, constituting part of urban buildings or street furniture. After application and drying, the thickness of the photocatalytic composition layer can vary within wide limits as a function of the building and of the photocatalytic effect that one wishes to obtain. Generally, a thickness from 0.05 mm to 1 mm, more preferably from 0.1 to 0.5 mm is sufficient.

NOTE

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. Photocatalytic composition, which comprises:
   (a) at least one cement binder, in the range of 20% to 50% by weight;
   (b) at least one photocatalyst, wherein the at least one photocatalyst includes Titanium Dioxide particles, photocatalytically active in the visible spectrum, the Titanium Dioxide particles comprising 0.5% to 5% by weight;
   (c) at least one cellulose having a Brookfield viscosity RVT at 20° C. from 100 to 70,000 mPa·s, wherein the at least one cellulose is in the range of 0.8% to 2.2% by weight;
   (d) at least one fluidizing agent, wherein the at least one fluidizing agent is in the range of 0.1% to 1.2% by weight;
   (e) at least one first calcareous filler in the form of particles of which at least 95% by weight has a dimension not greater than 40 µm, wherein the at least one first calcareous filler is in the range of 15% to 35% by weight;
   (f) at least one second calcareous filler in the form of particles of which at least 95% by weight has a dimension not greater than 20 µm, wherein the at least one second calcareous filler is in the range of 15% to 35% by weight, wherein the at least one second calcareous filler has finer particle size than the at least one first calcareous filler;
   (g) at least one thermal insulator material comprising hollow ceramic spheres with sub-mm diameters, in the range of 0.1% to 4% by weight, and
   (h) glass bubble borosilicate microspheres, in the range of 0.1% to 4% by weight.

2. Photocatalytic composition according to claim 1, wherein the cement binder (a) is a Portland cement.

3. Photocatalytic composition according to claim 1, wherein the photocatalyst is Titanium Dioxide particles in the anatase crystalline form.

4. Photocatalytic composition according to claim 3, wherein the Titanium Dioxide particles in the anatase crystalline form have a granulometry such that at least 95% by weight has a dimension not higher than 50 nm.

5. Photocatalytic composition according to claim 4, wherein the Titanium Dioxide particles in the anatase crystalline form have a granulometry such that at least 95% by weight has a dimension not higher than 20 nm.

6. Photocatalytic composition according to claim 3, wherein the photocatalytic titanium dioxide is in admixture with a non-photocatalytic titanium dioxide.

7. Photocatalytic composition according to claim 6, wherein the non-photocatalytic titanium dioxide is in the range of 2% to 10% by weight.

8. Photocatalytic composition according to claim 1, wherein the cellulose (c) has a Brookfield viscosity RVT at 20° C. from 100 to 30,000 mPa·s.

9. Photocatalytic composition according to claim 8, wherein the cellulose (c) has a Brookfield viscosity RVT at 20° C. from 200 to 10,000 mPa·s.

10. Photocatalytic composition according to claim 1, further comprising: (i) at least one hydrophobized vinyl polymer.

11. Photocatalytic composition according to claim 10, wherein the at least one hydrophobized vinyl polymer is in the range of 1% to 6% by weight.

12. Photocatalytic composition according to claim 10, wherein the at least one hydrophobized vinyl polymer is a terpolymer of vinylchloride, ethylene and a vinyl ester CH2=CH—O—C(=O)—R, wherein R is an alkyl, linear or branched, C4-C24.

13. Photocatalytic composition according to claim 1, in which the fluidizing agent is polycarboxylic acid.

14. Photocatalytic composition according to claim 1, including metakaolin in the range of 1.5% to 10% by weight.

15. Photocatalytic composition according to claim 1, including an anti-foaming agent in the range of 0.1% to 2.8% by weight.

16. Photocatalytic composition according to claim 1, wherein the hollow ceramic sub-mm spheres have a thermal conductivity below 0.20 W/mK.

17. Photocatalytic composition according to claim 1, wherein the hollow ceramic sub-mm spheres include a heat-reflective coating.

18. Photocatalytic composition according to claim 1, wherein the hollow ceramic sub-mm spheres have an average diameter below 200 µm.

19. Photocatalytic composition according to claim 18, wherein the hollow ceramic sub-mm spheres have an average diameter below 50 µm.

20. Photocatalytic composition according to claim 1, including an instantly dispersible pigment.

21. Photocatalytic composition according to claim 1, not including heavy metals and organic solvents.

22. Photocatalytic composition according to claim 1, with a content of volatile organic compounds (VOC) of less than 0.35 g/litre.

23. Photocatalytic composition according to claim 1, including air-entraining agents.

24. Photocatalytic composition according to claim 1, including kieselguhr.

25. A building or construction which has received a coating including a photocatalytic composition which comprises:
(a) at least one cement binder, in the range of 20% to 50% by weight;
(b) at least one photocatalyst, wherein the at least one photocatalyst includes Titanium Dioxide particles, photocatalytically active in the visible spectrum, the Titanium Dioxide particles comprising 0.5% to 5% by weight;
(c) at least one cellulose having a Brookfield viscosity RVT at 20° C. from 100 to 70,000 mPa·s, wherein the at least one cellulose is in the range of 0.8% to 2.2% by weight;
(d) at least one fluidizing agent, wherein the at least one fluidizing agent is in the range of 0.1% to 1.2% by weight;
(e) at least one first calcareous filler in the form of particles of which at least 95% by weight has a dimension not greater than 40 μm, wherein the at least one first calcareous filler is in the range of 15% to 35% by weight;
(f) at least one second calcareous filler in the form of particles of which at least 95% by weight has a dimension not greater than 20 μm, wherein the at least one second calcareous filler is in the range of 15% to 35% by weight, wherein the at least one second calcareous filler has finer particle size than the at least one first calcareous filler;
(g) at least one thermal insulator material comprising hollow ceramic spheres with sub-mm diameters, in the range of 0.1% to 4% by weight, and
(h) glass bubble borosilicate microspheres, in the range of 0.1% to 4% by weight.

26. A method of manufacturing a photocatalytic composition, and adding water to the photocatalytic composition, the method including mixing together photocatalytic composition components comprising:
(a) at least one cement binder, in the range of 20% to 50% by weight of the photocatalytic composition;
(b) at least one photocatalyst, wherein the at least one photocatalyst includes Titanium Dioxide particles, photocatalytically active in the visible spectrum, the Titanium Dioxide particles comprising 0.5% to 5% by weight of the photocatalytic composition;
(c) at least one cellulose having a Brookfield viscosity RVT at 20° C. from 100 to 70,000 mPa·s, wherein the at least one cellulose is in the range of 0.8% to 2.2% by weight of the photocatalytic composition;
(d) at least one fluidizing agent, wherein the at least one fluidizing agent is in the range of 0.1% to 1.2% by weight of the photocatalytic composition;
(e) at least one first calcareous filler in the form of particles of which at least 95% by weight has a dimension not greater than 40 μm, wherein the at least one first calcareous filler is in the range of 15% to 35% by weight of the photocatalytic composition;
(f) at least one second calcareous filler in the form of particles of which at least 95% by weight has a dimension not greater than 20 μm, wherein the at least one second calcareous filler is in the range of 15% to 35% by weight of the photocatalytic composition, wherein the at least one second calcareous filler has finer particle size than the at least one first calcareous filler;
(g) at least one thermal insulator material comprising hollow ceramic spheres with sub-mm diameters, in the range of 0.1% to 4% by weight of the photocatalytic composition, and
(h) glass bubble borosilicate microspheres, in the range of 0.1% to 4% by weight of the photocatalytic composition;
wherein water is added to the photocatalytic composition in a predetermined proportion, by mixing until a homogeneous and fluid product is obtained, wherein weight ratio between water and the at least one cement binder (a) is from 0.2 to 0.8.

\* \* \* \* \*